United States Patent
Sheret et al.

(10) Patent No.: US 11,885,890 B2
(45) Date of Patent: Jan. 30, 2024

(54) METHOD AND APPARATUS OF SINGLE EPOCH POSITION BOUND

(71) Applicant: u-blox AG, Thalwil (CH)

(72) Inventors: Ian Sheret, Silsoe (GB); Olivier Julien, Thalwil (CH); Rod Bryant, Thalwil (CH); Chris Hide, Reigate (GB)

(73) Assignee: u-blox AG, Thalwil (CH)

( * ) Notice: Subject to any disclaimer, the term of this patent is extended or adjusted under 35 U.S.C. 154(b) by 859 days.

(21) Appl. No.: 16/779,464

(22) Filed: Jan. 31, 2020

(65) Prior Publication Data
US 2021/0239845 A1    Aug. 5, 2021

(51) Int. Cl.
*G01S 19/39*    (2010.01)
*G01S 19/20*    (2010.01)
*G01S 19/24*    (2010.01)

(52) U.S. Cl.
CPC ............ *G01S 19/243* (2013.01); *G01S 19/20* (2013.01); *G01S 19/396* (2019.08)

(58) Field of Classification Search
CPC ................................ G01S 19/20; G01S 19/396
See application file for complete search history.

(56) References Cited
U.S. PATENT DOCUMENTS
2019/0339396 A1\* 11/2019 Turunen .................. G01S 19/26

OTHER PUBLICATIONS

Kaplan, Elliott D. et al., "Understanding GPS Principles and Applications", Artech House, 2nd ed., 2006 (Year: 2006) (Year: 2006).\*
Zhen Zhu and Eric Vinande, "Demonstration of Integrity Protection for Multi-Constellation Carrier Phase Solution Using RANSAC-Based FDE," Proceedings of the 2019 International Technical Meeting of The Institute of Navigation, Reston, Virginia, Jan. 2019, pp. 744-761.
Bill Triggs, Philip Mclauchlan, Richard Hartley, and Andrew Fitzgibbon, "Bundle Adjustment—A Modern Synthesis," In: Triggs B., Zisserman A., Szeliski R. (eds) Vision Algorithms: Theory and Practice. IWVA 1999. Lecture Notes in Computer Science, vol. 1883. Springer, Berlin, Heidelberg.

\* cited by examiner

*Primary Examiner* — Cassi J Galt
(74) *Attorney, Agent, or Firm* — FINNEGAN, HENDERSON, FARABOW, GARRETT & DUNNER LLP

(57) ABSTRACT

A method for determining a protection level of a position estimate using a single epoch of GNSS measurements, the method includes: specifying a prior probability density $P(x)$ of a state x; specifying a system model $h(x)$ that relates the state x to observables z of the measurements; quantifying quality metrics q associated with the measurements; specifying a non-Gaussian residual error probability density model $f(r|\theta, q)$ and fitting model parameters $\theta$ using a set of experimental data; and defining a posterior probability density $P(x|z, q, \theta)$; estimating the state x; and computing the protection level by integrating the posterior probability density $P(x|z, q, \theta)$ over the state x.

14 Claims, 10 Drawing Sheets

US 11,885,890 B2

METHOD AND APPARATUS OF SINGLE EPOCH POSITION BOUND

FIELD

The present disclosure relates generally to satellite-based navigation, and more particularly, to methods for determining a protection level of a position estimate, or parameters related to the determining, using a single epoch of global navigation satellite system (GNSS) observation data and/or measurements from other related sensors, and apparatus for operation thereof.

BACKGROUND

A GNSS receiver receives satellite signals transmitted from one or several GNSS satellite constellations and estimates its position, among other things, using information contained in the satellite signals. Often times, this estimation alone cannot provide sufficient accuracy and reliability due to, for example multipath interference suffered by the satellite signal. A consequence of providing a position estimate with errors that exceed a tolerable range can be significant. Thus, a probabilistic bound on errors associated with the position estimate needs to be determined.

The probabilistic bound on errors associated with the position estimate may be determined by modeling errors of a set of GNSS observables. However, when the observables are not independent from each other, the modelling of the observable errors is difficult, causing difficulty in determining the probabilistic bound on the errors associated with the position estimate.

SUMMARY

According to some embodiments of the present disclosure, there is provided a method for determining a protection level of a position estimate using a single epoch of global navigation satellite system (GNSS) measurements. The method includes: specifying, in advance, a prior probability density $P(x)$ of a state x; specifying, in advance, a system model $h(x)$ that relates the state x to observables z of the measurements; quantifying, during operation, quality metrics q associated with the measurements; specifying, in advance, a non-Gaussian residual error probability density model $f(r|\theta, q)$ and fitting model parameters $\theta$ determined off-line a priori; defining, during operation, a posterior state probability density $P(x|z, q, \theta)$; estimating, during operation, the state x; and computing, during operation, a protection level by integrating the posterior probability density $P(x|z, q, \theta)$ over the state x.

According to some embodiments of the present disclosure, there is provided a method for quantifying quality of a GNSS measurement. The method includes: performing the GNSS measurement in a window around an epoch of interest; determining a change in the GNSS measurement; identifying a consensus solution for a change in position and clock bias; and characterizing the quality of the GNSS measurement through deviation from the consensus.

According to some embodiments of the present disclosure, there is also provided an apparatus configured to determine a protection level of a position estimate using a single epoch of GNSS measurements. The apparatus includes: a receiver configured to receive a GNSS signal and process the received signal to generate the measurements; and a processor configured to: specify a prior probability density $P(x)$ of a state x; specify a system model $h(x)$ that relates the state x to observables z of the measurements; quantify quality metrics q associated with the measurements; specify a non-Gaussian residual error probability density model $f(r|\theta, q)$ and fitting model parameters $\theta$ determined off-line a priori; define a posterior probability density $P(x|z, q, \theta)$; estimating the state x, for instance using the posterior probability density $P(x|z, q, \theta)$; and compute the protection level by integrating the posterior probability density $P(x|z, q, \theta)$ over the state x.

According to some embodiments of the present disclosure, there is further provided a non-transitory computer-readable medium having stored therein instructions that, when executed by a processor, perform a method for determining a protection level of a position estimate using a single epoch of GNSS measurements, the method including: specifying a prior probability density $P(x)$ of a state x; specifying a system model $h(x)$ that relates the state x to observables z of the measurements; quantifying quality metrics q associated with the measurements; specifying a non-Gaussian residual error probability density model $f(r|\theta, q)$ and fitting model parameters $\theta$ determined off-line a priori; defining a posterior probability density $P(x|z, q, \theta)$; estimating the state x, for instance using the posterior probability density $P(x|z, q, \theta)$; and computing the protection level by integrating the posterior probability density $P(x|z, q, \theta)$ over the state x.

DETAILED DESCRIPTION

Figure 1:
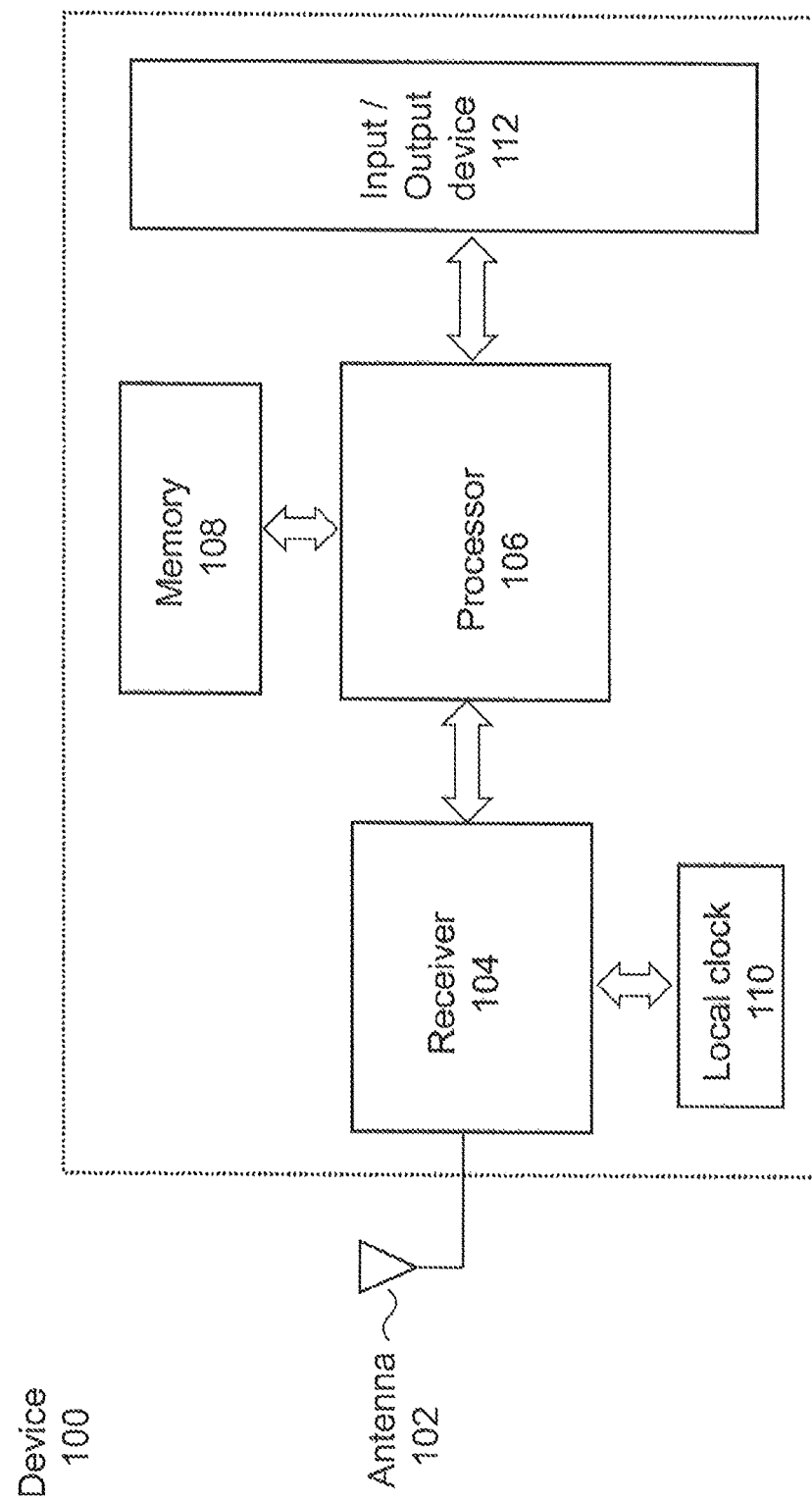
FIG. 1 is a block diagram of a device, consistent with some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of systems, apparatuses, and methods consistent with aspects related to the present disclosure as recited in the appended claims.

A GNSS receiver receives satellite signals transmitted from one or several GNSS satellite constellations through an antenna and estimates its position using information contained in the satellite signals. Many GNSS applications require a certain level of accuracy and reliability of the estimated position. A consequence of providing a position estimate (or any other parameters related to the estimation) with errors that exceed a tolerable range can be significant, for example, to autonomous vehicles that rely on trustworthy global position information.

The errors associated with a position estimate along a particular direction can be quantified using the concept of "protection level" in that direction. Protection level may be defined as a probabilistic bound on errors of a position estimate, specifying a constrained area and suggesting that the likelihood of the true position being outside that area is lower than a given value. The area may be provided in the form of an interval, a circle or a rectangle or any other shape. For example, the protection level may be provided as a circle surrounding the horizontal position estimated by a GNSS receiver. The protection level may be used to determine when to alert a user that the receiver is unable to provide a position estimate with a sufficient accuracy. For example, if the protection level exceeds a predetermined alert limit, an alarm may be triggered so that a client system can make proper adjustments. The system's ability to provide warnings to the user when the system position estimate is unreliable can be described using the concept of "integrity". If the protection level does not exceed the alert limit, then the user can be confident on the accuracy of the position estimate.

Determining a protection level from a set of GNSS observables (e.g., a pseudorange or a carrier phase or a Doppler) is a statistical problem that depends primarily on the error probability distribution of the observables. A Bayesian method may be used for calculating a posterior probability density (i.e., probability density on position) given a set of known error distributions of the observables. The protection level may then be determined by integrating the posterior probability density.

However, when the observables are not statistically independent from each other, the observable errors need to be modelled in a joint distribution. This makes the error distributions much more difficult to model and makes the posterior probability density much more difficult to determine, causing difficulty in calculating the protection level.

Embodiments of the present disclosure provide a method for determining a protection level of a position estimate using a single epoch of GNSS measurements. An epoch may be expressed as a set of measurements from a GNSS receiver at a single point in time. In an embodiment, a prior probability density of the state is specified; a system model that relates the state to observables of the measurements is specified; and a non-Gaussian measurement error probability density model is specified, based on fitting model parameters determined off-line a priori. In an embodiment, using a window-based method or RANSAC technique, quality metrics are derived and outliers of the measurements are excluded or de-weighted. A posterior probability density is defined and a protection level associated with a position estimate is determined by integrating the posterior probability density, using Markov chain Monte Carlo (MCMC) or an importance sampling method. In an embodiment, bound propagation is achieved using delta phase error distribution or data obtained by a sensor.

Embodiments disclosed herein have one or more technical effects. By considering observables from only a single epoch of GNSS measurements, the major source of non-independence (e.g., time correlation) is removed and the error distribution on each signal is modelled individually as a one-dimensional probability density function, leading to fast and rigorous determination of a protection level. Using a non-Gaussian error probability density model allows for proper consideration of the tail probability density, thereby ensuring accuracy of the process. Excluding or de-weighting the outliers of the measurements allows for enhanced accuracy and consistency of the determination. Using multiple MCMC chains with modified density functions for the integration of the posterior probability density allows for consideration of tail probability density on a multimodal distribution, further enhancing accuracy of the process. Performing bound propagation allows for the system to maintain high availability and low latency.

FIG. 1 is a block diagram of a device 100, consistent with some embodiments of the present disclosure. Referring to FIG. 1, device 100 may be mounted in a moving vehicle or in a fixed position. Device 100 may take any form, including but not limited to, a laptop computer, a GNSS receiver, a wireless terminal including a mobile phone, a wireless handheld device, or wireless personal device, or any other forms. Device 100 includes an antenna 102, a receiver 104 coupled to antenna 102, a processor 106, a memory 108, a local clock 110, and an Input/Output device 112.

Antenna 102 is configured to receive a GNSS signal. The GNSS signal may be received from a single satellite or a plurality of satellite signals respectively transmitted from a plurality of satellites in a plurality of frequency bands. The GNSS signal may also include signals originating from one or more virtual sources that reflect and/or scatter satellite signals. However, the signals received by antenna 102 are not limited to satellites signals, and can be any electromagnetic waves transmitted from any sources, for example, wireless cellular signals. Antenna 102 may be any type of antenna, for example, a patch antenna, a helix antenna, a crossed bow antenna, orthogonally placed monopole antennas, etc. Antenna 102 may be an array of antennas.

Receiver 104 is coupled to antenna 102 and configured to receive the GNSS signal via antenna 102. The GNSS signal received by antenna 102 may be transmitted to receiver 104 via a coaxial RF cable or any other cable suitable for transmitting an RF signal. In an embodiment, receiver 104 may be part of a transceiver modem which includes a transmitter configured to transmit data to an external device.

Receiver 104 may perform operations on the received GNSS signal, such as amplification, filtering, mixing, and digitization. Receiver 104 may also process the digitized signal and produce measurements, such as pseudorange measurement and carrier phase measurement. Receiver 104 may also determine measurement quality indicators, also referred to as quality metrics. The quality metrics may provide information about the quality of an environment in which the measurements are performed. Examples of the quality metrics include, but are not limited to, a carrier-to-noise density ratio, a satellite elevation, a phase lock time, a code lock time, and a cycle slip. The accuracy of the measurements made by receiver 104 may be correlated with the quality metrics associated with the measurements. Receiver 104 is also configured to communicate with the clock 110.

Processor 106 may include one or more dedicated processing units, application-specific integrated circuits (ASICs), field-programmable gate arrays (FPGAs), or various other types of processors or processing units. Processor 106 may receive, from receiver 104, the results of the pseudorange and carrier phase measurements, and the quality metrics associated with the measurements, and further process the information to estimate a current position of device 100 and a protection level of the position estimate. Processor 106 may also provide measurement quality metrics of its own. In an embodiment, processor 106 may include a navigation filter (e.g., a Kalman filter or a recursive LS filter) for determining a protection level. Processor 106 may be coupled to an external motion sensor, such as an accelerometer, a gyroscope, or a wheel speed sensor, to obtain position tracking information from the motion sensor and contribute to the determination of the protection level. Processor 106 is also configured to communicate with Input/Output device 112, and memory 108.

In an embodiment, receiver 104 may include a built-in processor (not shown) that performs all or part of the function of processor 106. In an embodiment, the built-in processor of receiver 104 may be a front-end processor that controls signal processing in receiver 104, and processor 106 may be a back-end processor that performs further computations based on the signal processing in receiver 104. In an embodiment, processor 106 may assign a computation task to a remote computer (not shown) so that the remote computer performs a portion of the computations and transmits the computation results to processor 106.

Memory 108 may be any type of computer-readable storage medium including volatile or non-volatile memory devices, or a combination thereof. Memory 108 may store information related to identities of device 100 and the GNSS signals received by antenna 102. Memory 108 may also store post-processing signals. Memory 108 may also store the pseudorange and the carrier phase measurements and the quality metrics associated with the measurements and measurements from other sensors. Memory 306 may also store computer-readable program instructions, mathematical models, and algorithms that are used in signal processing in receiver 104 and computations in processor 106. Memory 108 may further store computer-readable program instructions for execution by processor 106 to operate device 100.

Local clock 110 provides a time of a local place at which device 100 is disposed. Local clock 110 may be used to determine arrival time of a signal that is used in the pseudorange measurement and the position estimation.

Input/Output device 112 may be used to communicate a result of signal processing and computation to a user or another device. Input/Output device 112 may include a user interface including a display and an input device to transmit a user command to processor 106. The display may be configured to display a status of signal reception at device 100, the data stored at memory 108, a status of signal processing, and a result of computation, etc. For example, the display may display results of determined protection level to a user so that the user may have a better understanding of the position of device 100. The display may include, but is not limited to, a cathode ray tube (CRT), a liquid crystal display (LCD), a light-emitting diode (LED), a gas plasma display, a touch screen, or other image projection devices for displaying information to a user. The input device may be any type of computer hardware equipment used to receive data and control signals from a user. The input device may include, but is not limited to, a keyboard, a mouse, a scanner, a digital camera, a joystick, a trackball, cursor direction keys, a touchscreen monitor, or audio/video commanders, etc. Input/Output device 112 may further include a machine interface, such as an electrical bus connection or a wireless communications link.

In an embodiment, the mathematical models and algorithms used for determining a protection level of a position estimate may be based on Bayes theorem.

Bayes theorem provides a way to determine a probability density of an event, based on known prior information related to that event. Bayes theorem can be expressed with the following equation:

$$P(A\mid B) = \frac{P(B\mid A)P(A)}{P(B)} \quad (1)$$

where P(A|B) is the conditional probability of event A occurring given that B is true, P(B|A) is the conditional probability of event B occurring given that A is true, and P(A) and P(B) are the probabilities of A and B respectively, when considered independently.

When applied to an inference problem given a set of continuous-domain measurements, Bayes formula can be translated into the following equation:

$$P(\text{state}\mid \text{data}) = \frac{P(\text{data}\mid \text{state})P(\text{state})}{P(\text{data})} \quad (2)$$

where P(state|data) is the probability density of a particular state for a given set of observations, P(data|state) is the probability density of a particular set of observations for a given state, P(state) is a prior probability density of the state, and P(data) is the probability density of the set of observations. Information about the state may be inferred from the observables (e.g., a pseudorange or a carrier phase), and the P(state|data) corresponds to a posterior probability density that needs to be determined in order to compute a protection level of a position estimate. P(data) may be treated as an unknown normalization factor, and can be inferred using the fact that an integral of the posterior probability density P(state|data) over all states equals one. P(data|state) is closely related to the measurement error probability distribution and may be specified by a mathematical model, as discussed below.

In an embodiment, the above Equation (2) is applied to a GNSS measurement. A state (x) may include, but is not limited to, a position, a clock bias, an instrumental bias, or an atmospheric parameter. The clock bias may include a receiver clock bias and a satellite clock bias. The GNSS measurement may include a set of observations z, such as a pseudorange measurement and a carrier phase measurement. The measurement may also include a set of quality metrics q (metadata) that indicate information about the quality of the observations, such as a carrier-to-noise density ratio.

The set of observations z may be partitioned into two components: a system model h(x) that relates a state x to the observables of the set of observations z, and a random measurement error component (residual) r:

$$z = h(x) + r; \quad (3)$$

The probability density for the residual r may be defined by a function $f_{joint}(r\mid \theta, q)$, which specifies the probability density for a specified set of residuals r, given error model parameters $\theta$ and the set of quality metrics q. Returning to Equation (2), the posterior probability density $P(x|z, q, \theta)$ can be expressed as:

$$P(x|z, q, \theta) = \frac{P(z|x, q, \theta)P(x)}{P(z|q, \theta)}. \quad (4)$$

Taking the denominator $P(z|q, \theta)$ to be an unknown normalization constant, and $r=z-h(x)$, the posterior probability density $P(x|z, q, \theta)$ can be expressed as follows:

$$P(x|z,q,\theta) \propto P(z|x,q,\theta)P(x) \quad (5)$$

$$P(x|z,q,\theta) \propto f_{joint}(z-h(x)|\theta,q)P(x) \quad (6)$$

In an embodiment, in determining the posterior probability density $P(x|z, q, \theta)$, the observables from a single measurement epoch is considered. For a single measurement epoch, since there is no time correlation between the measurements, the measurements can be considered as independent. Thus, the joint probability density $f_{joint}(r|\theta, q)$ can be calculated as a simple product of the independent probability density $f(r|\theta, q)$ of each observation:

$$f_{joint}(z-h(x)|\theta, q) = \prod_i f(z_i - h_i(x)|\theta, q_i). \quad (7)$$

Thus, the Equation (6) can be simplified as follows:

$$P(x|z, q, \theta) \propto P(x) \prod_i f(z_i - h_i(x)|\theta, q_i). \quad (8)$$

In this way, the measurement error distribution is simplified to a one dimensional function $f(r|\theta, q)$ of the residual r, and this error distribution may be determined using experimental data. A protection level of a position estimate may be further determined from the posterior probability density $P(x|z, q, \theta)$, for example, by integrating the posterior probability density $P(x|z, q, \theta)$ over the state x.

Figure 2:
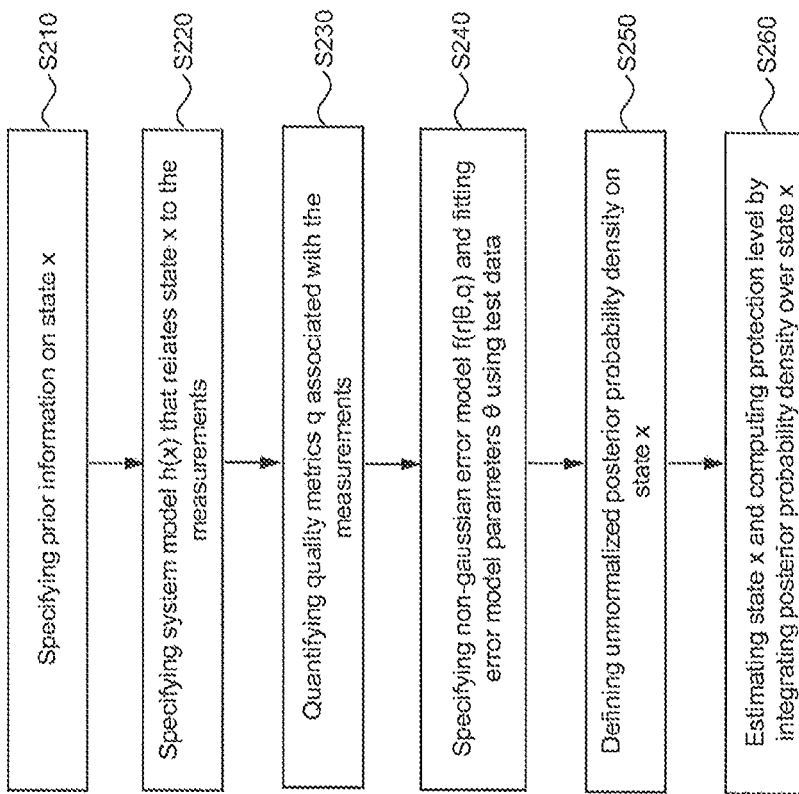
FIG. 2 is a flow chart illustrating a method for determining a protection level of a position estimate, consistent with some embodiments of the present disclosure.

FIG. 2 is a flow chart illustrating a method 200 for determining a protection level of a position estimate, consistent with some embodiments of the present disclosure. The method may be performed by a device, such as device 100 of FIG. 1. Referring to FIG. 2, method 200 includes a step S210 of specifying prior information on the state x. For example, a prior probability density P(x) of the state x may be specified using knowledge about the state x before making the measurements. In an embodiment, specifying the prior information may be performed in advance of the measurements.

Method 200 includes a step S220 of specifying system model h(x) that relates the state x to the observables of the measurements. The observables may include a pseudorange R and a carrier phase $\Phi$.

In an embodiment, a mathematical model for the pseudorange R can be expressed as follows:

$$R=\rho+c(dt_r-dt_s)+T+\alpha_f STEC+k_{P,r}+k_{P,s}+m_P+\epsilon_P \quad (9)$$

where $\rho$ is a geometric range, c is the speed of light in vacuum, $dt_r$ and $dt_s$ are receiver and satellite clock biases from the GNSS time scale, T is a tropospheric delay, $\alpha_f STEC$ is an ionospheric delay (STEC is the slant total electron count integrating the electron density along the signal path, and $\alpha_f$ is a frequency dependent conversion factor relating STEC to delay), $k_{P,r}$ and $k_{P,s}$ are receiver and satellite code instrumental delays which depend on code and frequency, $m_P$ is an effect of multipath interference to the pseudorange, and $\epsilon_P$ is an effect of receiver noise to the pseudorange.

In an embodiment, a mathematical model for the carrier phase 4 can be expressed as follows:

$$\Phi=\rho+c(dt_r-dt_s)+T-\alpha_f STEC+k_{L,r}-k_{L,s}+\lambda n+\lambda w+m_L+\epsilon_L \quad (10)$$

In addition to the terms defined as above, $k_{L,r}$ and $k_{L,s}$ are receiver and satellite code instrumental delays, respectively, $m_L$ is an effect of multipath interference to the carrier phase, $\lambda$ is a wavelength of a transmitted GNSS signal, n is an integer ambiguity, w is a circular polarization wind-up, and $\epsilon_L$ is an effect of receiver noise to the carrier phase. The carrier phase measurements can be traditional single frequency measurements or a combination of carrier phase measurements obtained from signals at different frequencies, such as a wide-lane combination.

In an embodiment, a correction to the pseudorange R and a correction to the carrier phase $\Phi$ may be calculated using data obtained from one or several physical or virtual base stations or a correction service or an augmentation system. Specifically considering corrections coming from a base station, the base station may be a reference device whose accurate position is known. This correction may remove satellite bias terms and reduce the effect of ionospheric and tropospheric delays and mitigate errors in clocks and orbits. The corrections based on the base station data can be expressed as follows:

$$R_{correction}=R_{base}-\rho_{predicted} \quad (11)$$

$$\phi_{correction}=\phi_{base}-\rho_{predicted}/\lambda \quad (12)$$

where $R_{base}$ and $\phi_{base}$ are a pseudorange and a carrier phase observed from the base station, respectively, $R_{correction}$ and $\phi_{correction}$ are corrections to the pseudorange and the carrier phase, respectively, and $\rho_{predicted}$ is a predicted geometric range given the base station's known position.

The corrections based on data obtained by a rover (e.g., device 100 of FIG. 1) are then calculated as:

$$R_{corrected}=R_{rover}-R_{correction} \quad (13)$$

$$\Phi_{corrected}=\Phi_{rover}-\Phi_{correction} \quad (14)$$

The corrected pseudorange observable can be expressed as follows:

$$R_{corrected}=\rho+c\Delta dt_r+\Delta T+\alpha_f \Delta STEC+\Delta k_{P,r}+m_{P,rover}-m_{P,base}+\epsilon_P \quad (15)$$

where, in addition to the terms defined as above, $\Delta dt_r$ is a difference in receiver clock bias between the rover and the base station ($\Delta dt_r=dt_{rover}-dt_{base}$), $\Delta T$ is a difference in tropospheric delay, $\alpha_f \Delta STEC$ is a difference in ionospheric delay, $\Delta k_{P,r}$ is a difference in receiver code instrumental delays, $m_{P,rover}$ is an effect of multipath on the pseudorange measured at the rover, and $m_{P,base}$ is an effect of multipath on the pseudorange measured at the base station. Both the rover and the base station receiver noises have been subsumed into $\epsilon_P$.

Similarly, the corrected phase observable can be expressed as follows:

$$\Phi_{corrected}=\rho+c\Delta dt_r+\Delta T-\alpha_f \Delta STEC+\Delta k_{L,r}+\lambda(n_{rover}-n_{base})+\lambda \Delta W+m_{L,rover}-m_{L,base}+\epsilon_L \quad (16)$$

where, in addition to the terms defined above, $\Delta k_{L,r}$ is a difference in receiver code instrumental delays, $m_{L,rover}$ is an effect of multipath on the carrier phase measured at the rover, $m_{L,base}$ is an effect of multipath on the carrier phase measured at the base station, n is an integer ambiguity, $\Delta w$ is a difference in circular polarization wind-up. Both the rover and the base station receiver noises have been subsumed into $\epsilon_L$.

In an embodiment, the part of the circular polarization wind-up term caused by satellite rotations can be cancelled, and for a single-epoch analysis wind-up due to rover rotations can be absorbed by the instrumental bias term $\Delta k_{L,r}$ and hence neglected. If only short baselines (<20 km) are used, the ionospheric terms $\alpha_f \Delta STEC$ can also be ignored. The tropospheric delay is modelled using an obliquity factor M(E) depending only on satellite elevation E. Thus, the final observable models can be simplified as follows:

$$R_{corrected} = \rho + c\Delta dt_r + \Delta T_{zenith} M(E) + \Delta k_{P,r} + m_{P,rover} - m_{P,base} + \epsilon_P \quad (17)$$

$$\Phi_{corrected} = \rho + c\Delta dt_r + \Delta T_{zenith} M(E) + \Delta k_{L,r} + \lambda(n_{rover} - n_{base}) + m_{L,rover} - m_{L,base} + \epsilon_L \quad (18)$$

where, in addition to the terms defined as above, $\Delta T_{zenith}$ is a difference in zenith tropospheric delays.

In this way, the observables (the pseudorange R and the carrier phase $\Phi$) are expressed as a function of the state x. In an embodiment, the corrections to the observables may be optional. In an embodiment, specifying the system model may be performed in advance of the measurements.

In an embodiment, the state x may be defined as the following state vector:

$$x = \begin{bmatrix} p \\ c\Delta dt_r \\ \Delta k_{P,r} \\ \Delta k_{L,r} \\ \Delta T_{zenith} \end{bmatrix} \quad [19]$$

where, in addition to the terms defined above, p is a position of a rover. The instrumental biases $\Delta k_{P,r}$ and $\Delta k_{L,r}$ include one bias per GNSS signal type, though the pseudorange bias on one GNSS is taken to be zero by definition and hence is omitted in the state vector. In an embodiment, the GNSS includes GPS, Galileo (a GNSS created by the European Union), and GLONASS (a GNSS created by Russia), and therefore, a typical epoch has ten states in x (three in p, one for $\Delta dt_r$, two for the Galileo and GLONASS pseudorange biases $k_{P,r}$, three for the GNSS specific phase biases $\Delta k_{L,r}$ and one for $\Delta T_{zenith}$).

Method 200 includes a step S230 of quantifying quality metrics q associated with the measurements. In an embodiment, some quality metrics, such as a carrier-to-noise density ratio, an effect of multipath interference, and a satellite elevation, may be provided by a GNSS device, such as device 100 of FIG. 1; and some other quality metrics, for example, more information of the GNSS signals, may be obtained by checking consistency between different satellites. In an embodiment, quantifying the quality metrics may be performed during operation, for example, during the measurements. In checking the consistency between different satellites, the quantities which are not used by the main bound calculation, for example, changes in pseudorange and carrier phase in an immediate vicinity of the epoch of interest, may be the focus of the checking.

In an embodiment, some measurements that affect accuracy and consistency of the method are excluded or de-weighted. For example, some signals that are severely affected by multipath interference are identified and excluded. Some non-line-of-sight signals that are likely to create large errors are also excluded.

In an embodiment, the measurements that adversely affect accuracy and consistency of the method are excluded based on a random sample consensus (RANSAC) technique. For example, a set of delta-phase measurements over a one second interval, including signals in both frequency bands L1 and L2, may be the input of the RANSAC technique. Only signals which are phase-locked for at least one second can participate in this method, so all other signals are immediately excluded. Over the one second short interval, changes in the instrumental bias $\Delta k_{L,r}$, the tropospheric delay $\Delta T_{zenith}$ M(E), and the base station multipath $m_{L,base}$ are extremely small, and thus, can be ignored. A change in phase $\Delta \psi_{corrected}$ is then given by:

$$\Delta \Phi_{corrected} = \Delta \rho + c\Delta\Delta dt_r + \lambda(\Delta n_{rover} - \Delta n_{base}) + \Delta m_{L,rover} + \epsilon_L \quad (20)$$

where $\Delta \rho$ is a change in the range over the one second interval, $\Delta\Delta dt_r$ is a change in the residual clock bias, $\Delta n_{rover}$ and $\Delta n_{base}$ are changes in the ambiguity (i.e., cycle slips), and $\Delta m_{L,rover}$ is a change in the multipath interference contribution.

Some signals may be severely affected by non-line-of-sight (NLOS) signals and multipath interference, and here, the multipath interference term $\Delta m_{L,rover}$ may be large. Some signals may be severely affected by cycle slips, and hence $\lambda(\Delta n_{rover} - \Delta n_{base})$ may be large. Signals with a multipath interference term $\Delta m_{L,rover}$ greater than a threshold multipath interference or signals with a cycle slip term $\lambda(\Delta n_{rover} - \Delta n_{base})$ greater than a threshold cycle slip may be identified as outliers, and are excluded.

Figure 3:
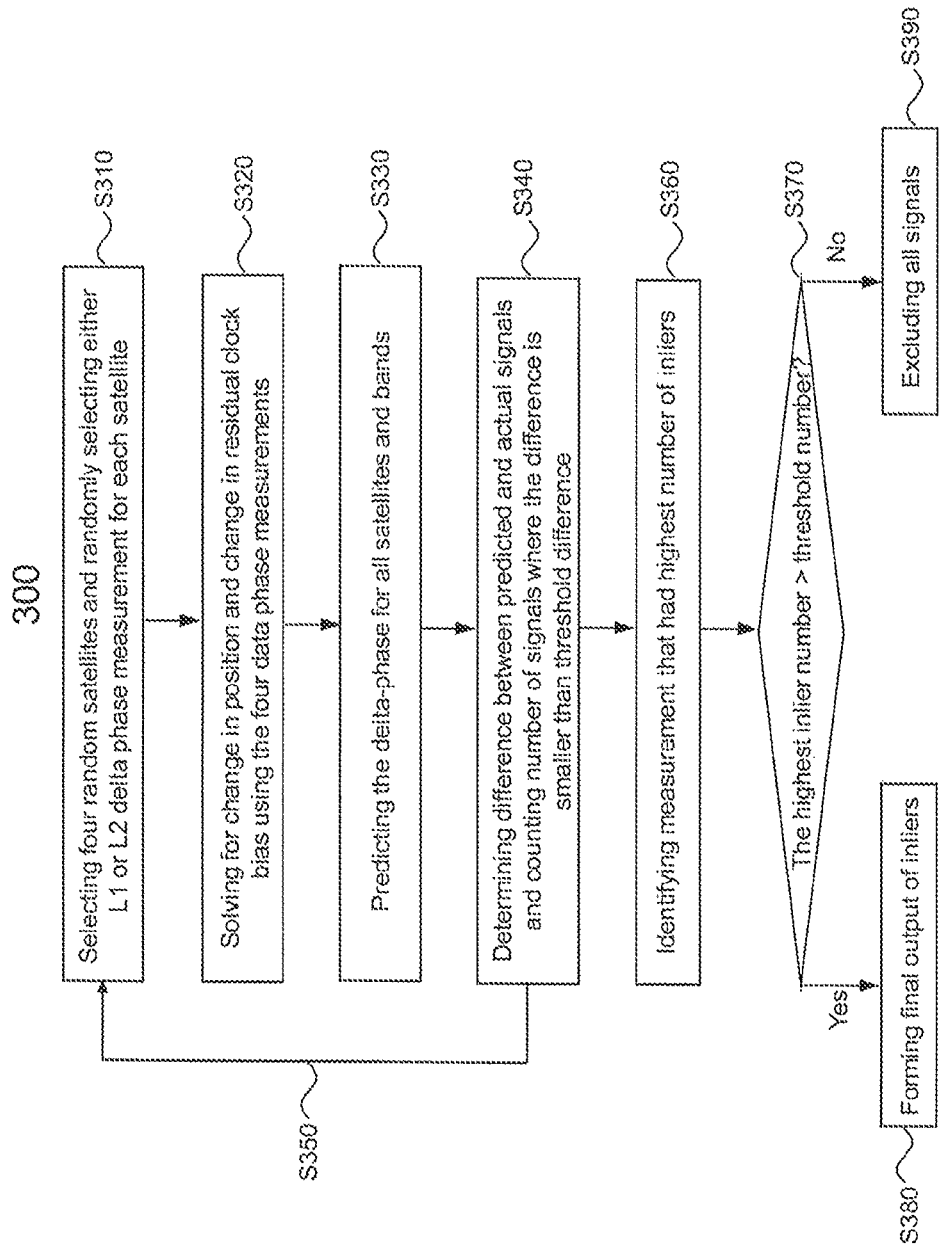
FIG. 3 is a flow chart illustrating a method for identifying outliers of GNSS measurements, consistent with some embodiments of the present disclosure.

FIG. 3 is a flow chart illustrating a method 300 for identifying outliers of GNSS measurements, consistent with some embodiments of the present disclosure. Referring FIG. 3, method 300 includes a step S310 of selecting four random satellites and randomly selecting either a L1 band or a L2 band delta-phase measurement for each satellite.

Method 300 includes a step S320 of solving for a change in position and a change in residual clock bias using the four delta phase measurements. This is solvable because the system is a linear system with four measurements and four unknowns.

Method 300 includes a step S330 of predicting the delta-phase for all satellites and bands using the solution in step S320. Based on the solution obtained in step S320, the delta phase for all satellites and bands can be predicted. Method 300 includes a step S340 of determining a difference between a predicted signal and an actual signal and counting the number of signals where the difference is smaller than a threshold difference. Signals where the difference between the predicted and the actual values is smaller than the threshold difference are considered as the inliers of the measurements.

Method 300 includes a step S350 of repeating the steps 310-340 for a certain number of iterations. The number of iterations may be determined based on a confidence level that ensures an efficient convergence to the solution. Method 300 includes a step S360 of identifying a measurement that had a highest number of inliers. Step S360 is performed after all the iterations in step S350 are completed.

Method 300 includes a step S370 of determining whether the highest inlier number is greater than a threshold inlier number (e.g., a predetermined minimum number of the inliers). If the result of the determining is "Yes", method 300 performs a step S380 of forming a final output of the inliers of the measurements. On the other hand, if the result of the determining is "No", method 300 performs a step S390 of excluding all the signals as the outliers of the measurements; In an embodiment, the number of iterations in step S350 may be 100, the threshold difference in step S340 is 0.02 m, and the threshold number of the inliers in step S370 is 15.

In this way, the outliers of the measurements are identified and excluded using RANSAC technique, thereby enhancing accuracy and consistency of the measurements.

Referring back to FIG. 2, in step S220 of method 200, instead of using the RANSAC technique, a window-based technique may be used to obtain derived quality metrics. The window-based quality metrics may be specified by finding consistency in both delta phase and delta pseudorange over a small window of time, for example, up to four seconds long, as described in detail below with reference to FIG. 4.

Figure 4:
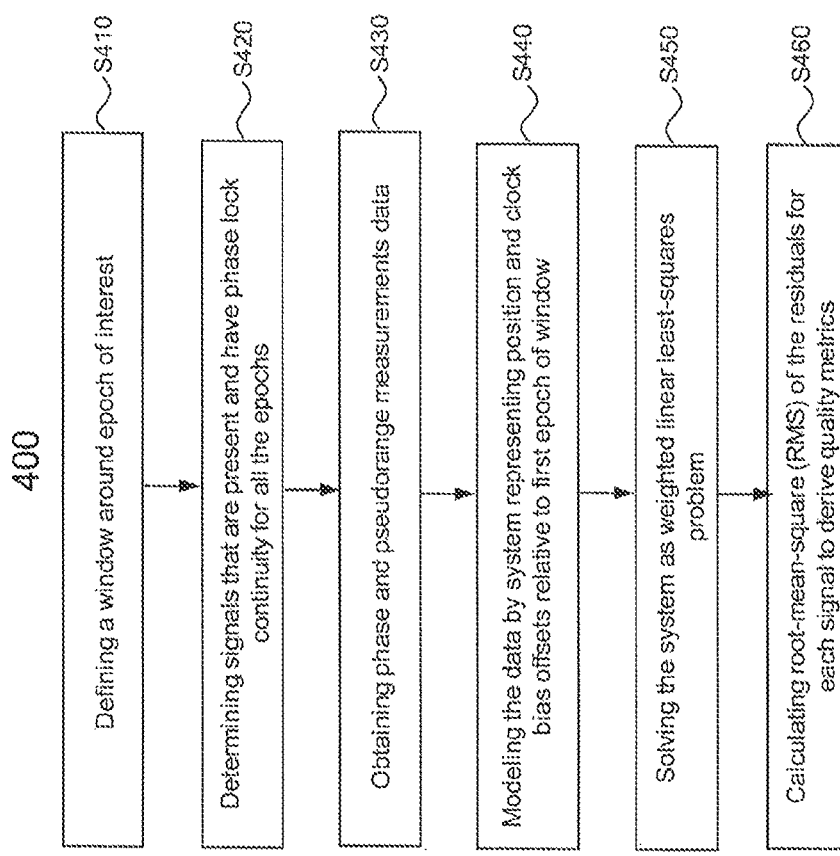
FIG. 4 is a flow chart illustrating a method for quantifying quality metrics associated with GNSS measurements, consistent with some embodiments of the present disclosure.

FIG. 4 is a flow chart illustrating a method 400 for quantifying quality metrics associated with GNSS measurements, consistent with some embodiments of the present disclosure. Referring FIG. 4, method 400 includes a step S410 of defining a window around an epoch of interest. A width of the window is configurable. In an embodiment, the window width may be a half-width of two seconds. The window may be symmetric and may have a full-width of four seconds, and may contain data from, for example, five epochs (i.e., the number of samples $n_{samples}$=5). The use of epochs which are after the epoch of interest implies that the algorithm has latency that equals to the window half-width when implemented in a real-time system.

Method 400 includes a step S420 of determining signals that are present at all specified epochs (e.g., the five epochs) and have phase lock continuity for all epochs. A total number of signals $n_{sig}$ is the sum of the number of signals in the L1 frequency band $n_{L1}$ and the number of signals in the L2 band $n_{L2}$ ($n_{sig}=n_{L1}+n_{L2}$). In order to be included, signals need to be present and have phase lock continuity for all the epochs. Signals that do not meet these conditions may be excluded.

Method 400 includes a step S430 of obtaining phase and pseudorange measurements data. The total number of phase measurements is given by $n_{samples} \times (n_{L1}+n_{L2})$. Similarly, the total number of pseudorange measurements is $n_{samples} \times (n_{L1}+n_{L2})$, providing a total number of data points $m=2n_{samples} \times (n_{L1}+n_{L2})$. In an embodiment, instead of the phase and pseudorange measurements, a Doppler measurement is performed in the window around the epoch of interest, and the obtaining in step S430 is obtaining Doppler measurement data.

Method 400 includes a step S440 of modeling the measurement data by a system that represents position and clock bias offsets relative to a first epoch of the window, along with fixed bias terms for phase and pseudorange in each band. The total number of free parameters is therefore $n=4(n_{samples}-1)+4$.

Method 400 includes a step S450 of solving the system, for instance, using a weighted linear least-squares problem. For example, the m data points are placed in a column vector y, a column vector x is defined to hold the n free parameters, and an m×n size matrix A is defined for a linear model y=Ax. Next, a column vector of weights w is defined, with one weight for each measurement, with pseudoranges given a weight $1/\sigma_{PR}$ and phases given a weight $1/\sigma_{phase}$. For a given state x, a residual r can be expressed as follows:

$$r=y-Ax \tag{21}$$

The best-fit linear unbiased estimator of a solution $\hat{x}$ is:

$$\hat{x} = \arg \min_x \frac{1}{2} \sum_i (w_i r_i)^2. \tag{22}$$

Equation (22) can be solved numerically by transforming the problem into a standard form:

$$A'=\text{diag}(w)A \tag{23-1}$$

$$y'=\text{diag}(w)y \tag{23-2}$$

and solving $$(A'^T A)\hat{x}=A'^T y \tag{24}$$

for $\hat{x}$.

In an embodiment, a loss function on the residuals may be defined as follows:

$$\hat{x} = \arg \min_x \frac{1}{2} \sum_i \rho((w_i r_i)^2) \tag{25}$$

where $\rho(s)$ is a loss function.

For example, a Huber loss function may be introduced as follows:

$$\rho(s) = \begin{cases} s & \text{if } |s| < \delta \\ 2\delta\left(\sqrt{s} - \frac{1}{2}\delta\right) & \text{otherwise} \end{cases} \tag{26}$$

with a threshold parameter $\delta$ set to 2. This has the effect of de-weighting the outliers of the measurements. The best-fit solution $\hat{x}$ may be then found using a robust Gauss-Newton algorithm. Steps S440 and S450 amount to identifying a consensus solution, for example, a consensus for a change in position and clock bias. Deviation from the consensus can be used to characterize quality of a GNSS measurement as described below.

Method 400 ends with a step S460 of calculating a root mean square (RMS) of the residuals for each signal to derive the quality metrics. This amounts to determining deviation from the consensus. Once the solution of Equation (22) is found, residuals may be calculated. For each signal, the RMS of the residuals may be calculated, and this forms the derived quality metrics. Phase and pseudorange metrics may be calculated separately. In an embodiment, these metrics may be used to exclude signals. As an example, the parameters for method 400 may be set as follows: the maximum allowed pseudorange RMS is 3 m; the maximum allowed phase RMS is 0.05 cycles; and at least 15 signals must pass both these checks, or else the entire epoch will be excluded.

In this way, de-weighting of outliers of the measurements is achieved and the derived quality metrics are obtained using both delta pseudorange and delta phase, without a large number of iterations for convergence, leading to the enhanced efficiency and accuracy of the process.

Referring back to FIG. 2, method 200 includes a step S240 of specifying a non-Gaussian error probability density model $f(r|\theta, q)$ and fitting error probability density model parameters $\theta$ using experimental data. In an embodiment, specifying the non-Gaussian error probability density model and fitting the model parameters may be performed in advance of the measurements, for example, off-line a priori. In an embodiment, the non-Gaussian model is a student-t distribution model, and the pseudorange errors are modelled as the student-t distribution, with a probability density expressed as:

$$f_{pr}(r) = \frac{\Gamma\left(\frac{v+1}{2}\right)}{\sqrt{v\pi\sigma^2}\,\Gamma\left(\frac{v}{2}\right)}\left(1 + \frac{r^2}{\sigma^2 v}\right)^{-\frac{v+1}{2}} \quad (27)$$

where r is a residual, v is a degrees of freedom parameter, σ is a scaling parameter which defines a width of a core distribution, and r is the gamma function.

The parameters v and σ are not constants, and may depend on the quality metrics q. In an embodiment, three quality metrics may be used: satellite elevation (el), carrier-to-noise density ratio (cno), and phase lock time (t). In order to simplify the fitting process, the basic student-t parameters σ and v are first defined in terms of quantities which are valid for any real number (referred to as unconstrained intermediate parameters σ' and v'):

$$\sigma = \log(1 + e^{(\sigma')}) \quad (28)$$

$$v = \log(1 + e^{(v')}) \quad (29)$$

Use of these unconstrained intermediate parameters σ' and v' allows the model fitting process to be handled as an unconstrained optimization problem, avoiding the need to represent the constraint that α and v must both the positive numbers.

The unconstrained student-t parameters are then defined as a function of the quality metrics:

$$\begin{pmatrix}\sigma'\\v'\end{pmatrix} = X_o + X_1\begin{pmatrix}1/el\\cno\end{pmatrix} \quad (30)$$

where $X_0$ is a 2×1 matrix, and $X_1$ is a 2×2 matrix. This model has six free parameters in total: two in $X_0$ and four in $X_1$. Bundling all these unconstrained parameters into a vector θ, and all quality metrics into q, the probability density of a residual $r_i$ with quality metrics $q_i$ is written as:

$$f_{pr}(r_i|\theta, q_i) \quad (31)$$

The model is identified by finding maximum likelihood values for the nine parameters (six free parameters plus residual $r_i$, vector θ, and quality metrics $q_i$), given a set of measurements observational data. Using Bayes' formula:

$$P(\text{model}|\text{data}) = \frac{P(\text{data}|\text{model})P(\text{model})}{P(\text{data})}. \quad (32)$$

The maximum likelihood model is the one which maximizes P (model|data). Using θ to represent the model described in Equation (32), r to represent the observed residuals, and q the associated quality metrics, Equation (32) becomes:

$$P(\theta|r, q) = \frac{P(r|\theta, q)P(\theta)}{P(r|q)}. \quad (33)$$

A maximum likelihood value for θ is denoted $\hat\theta$, and is given by $$\hat\theta = \arg\max_\theta P(\theta|r, q) \quad (34)$$

$$= \arg\max_\theta \frac{P(r|\theta, q)P(\theta)}{P(r|q)}. \quad (35)$$

This is a maximization problem with respect to θ. P(r|q) is a normalization factor and can be ignored. Then Equation (35) becomes:

$$\hat\theta = \arg\max_\theta P(r|\theta, q)P(\theta) \quad (36)$$

The prior model parameters P(θ) is taken to be uniform, and therefore can be omitted. Thus, Equation (36) can be simplified as:

$$\hat\theta = \arg\max_\theta P(r|\theta, q) \quad (37)$$

$$= \arg\max_\theta f_{pr}(r|\theta, q) \quad (38)$$

The combined probability density for entire dataset $f_{pr}$ (r|θ, q) can be evaluated as the product of all the individual probability densities for each residual:

$$\hat\theta = \arg\max_\theta \prod_i f_{pr}(r_i|\theta, q_i) \quad (39)$$

In an embodiment, instead of direct evaluation of the entire dataset for numerical optimization, a log likelihood is used, and Equation (39) becomes:

$$\hat\theta = \arg\max_\theta \sum_i \ln f_{pr}(r_i|\theta, q_i) \quad (40)$$

The maximum likelihood model $\hat\theta$ can then be found via standard numerical optimization. In an embodiment, separate models may be created for moving and stationary epochs, as the pseudorange error distribution has different characteristics in these two cases.

In an embodiment, similar to the pseudorange model above, carrier phase residuals are modelled as a student-t distribution. In the phase residual model, the error distribution may be modeled as a student-t plus uniform mixture, bounded to the range ±0.5. As the observable here is a phase, errors larger than 0.5 cycles may not occur. The basic probability density of the mixture is as follows:

$$f_{phase}(r) = w + (1-w)\frac{\Gamma\left(\frac{v+1}{2}\right)}{\sqrt{v\pi\sigma^2}\,\Gamma\left(\frac{v}{2}\right)}\left(1 + \frac{r^2}{\sigma^2 v}\right)^{-\frac{v+1}{2}} \quad (41)$$

As is the case for pseudorange, the basic parameters w, σ and v are not constants but are functions of the quality metrics. The basic parameters are first defined in terms of unconstrained values:

$$\sigma = \log(1 + e^{(\sigma')}) \quad (42)$$

$$v = \log(1 + e^{(v')}) \quad (43)$$

$$w = \frac{\tan^{-1}(w')}{\pi} + 0.5 \quad (44)$$

Mapping between w' and w allows w' to take any value, while constraining w to be between 0 and 1. The unconstrained parameters are then defined in terms of the quality metrics. Only the satellite elevation (el) information is used here:

$$\begin{pmatrix} \sigma' \\ v' \end{pmatrix} = X_0 + X_1(1/el) \quad (45)$$

The remaining unconstrained parameter w' is taken to be independent of the satellite elevation. There are five free parameters in total, two in $X_0$, two in $X_1$ and one for w'. The model fitting process is then similar to the method used for pseudorange. A single model covers both stationary and moving epochs, as a motion of a vehicle does not significantly affect the phase error distribution.

For a performance optimization, the uniform student mixture may be approximated by taking the maximum of the two components of $f_{phase}(r)$:

$$f_{phase}(r) = \max\left(w, (1-w) \frac{\Gamma\left(\frac{v+1}{2}\right)}{\sqrt{v\pi\sigma^2}\,\Gamma\left(\frac{v}{2}\right)} \left(1 + \frac{r^2}{\sigma^2 v}\right)^{-\frac{v+1}{2}}\right) \quad (46)$$

Similar to the pseudorange above, Equation (46) may also be evaluated using a log-likelihood.

Figure 5:
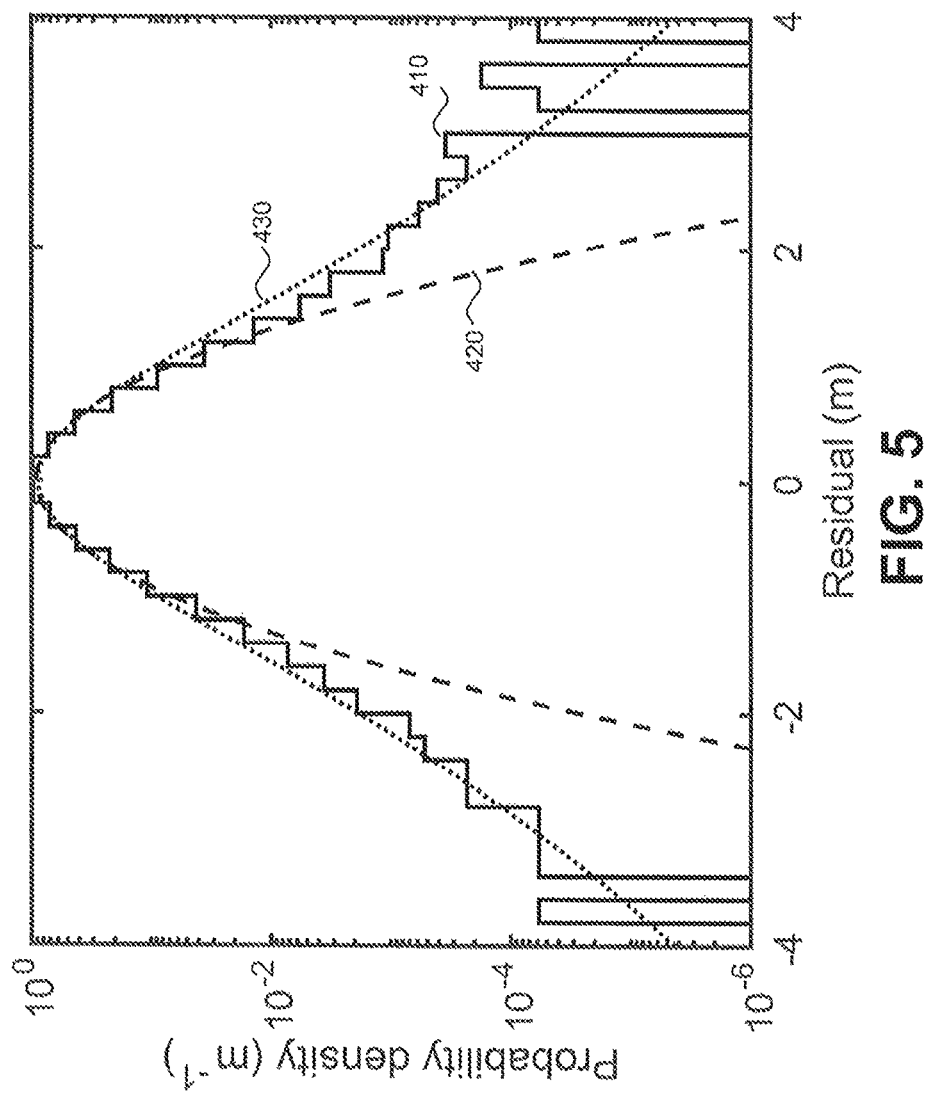
FIG. 5 shows a comparison of an observed residual error distribution, a Gaussian distribution fit to the observed residual error distribution, and a student-t distribution fit to the observed residual error distribution, consistent with some embodiments of the present disclosure.

FIG. 5 shows a comparison of an observed residual error distribution (410), a Gaussian distribution fit (420) to the observed residual error distribution, and a student-t distribution fit (430) to the observed residual error distribution, consistent with some embodiments of the present disclosure. The observed residual error distribution is pseudorange residual error distribution obtained using a receiver disposed in a moving vehicle, with a satellite (Galileo) elevation between 10-30 degrees. As shown in FIG. 5, the Gaussian distribution fit (420) is a poor fit to the observed residual error distribution (410), because the observed residual error distribution (410) has much heavier tails than the Gaussian distribution fit. On the other hand, the student-t distribution fit (430) is an improved fit to the observed residual error distribution (410), indicating that the student-t distribution is a better choice for modelling residual error distribution than the Gaussian distribution.

Referring back to FIG. 2, method 200 includes a step S250 of defining an unnormalized posterior probability density on the state x. In an embodiment, defining the unnormalized posterior probability density may be performed during operation. In an embodiment, an unnormalized posterior probability density is defined by using Equation (8) above. With the mathematical form of the error distributions defined, and the error model parameters θ fit to a set of experimental data, the likelihood of a particular set of measurements can be calculated given the state x:

$$P(z \mid \theta, x) = \prod_i f(r_i \mid \theta, q_i) \quad (47)$$

$$= \prod_i f(z_i - h_i(x) \mid \theta, q_i) \quad (48)$$

Here, $h_i(x)$ is the system model which predicts the observable z, given the state x of the system. Taking P(z) to be an unknown normalization constant, the final posterior probability density is given by:

$$P(x \mid \theta, z, q) \propto P(x) \prod_i f(z_i - h_i(x) \mid \theta, q_i) \quad (49)$$

where P(x) is the prior state probability. In an embodiment, P(x) is taken to be uniform in all states except for $\Delta T_{zenith}$, which is taken to have a Gaussian distribution centered on zero and with standard deviation 5 cm.

Method 200 includes a step S260 of estimating state x and computing the protection level by integrating the posterior probability density over the state x. The state x may be estimated, for example, using the posterior probability density P(x|z, q, θ). The integration may be done numerically, for example, using Markov chain Monte Carlo (MCMC) or importance sampling method. In an embodiment, estimating the state x and computing the protection level may be performed during operation.

In an embodiment, the integration of the posterior probability density over the state x is performed based on MCMC, but multiple chains with modified density functions are used to give accurate estimates of tail density on a multimodal distribution. A multimodal may be characterized by existence of multiple different modes of distribution. For example, in a first stage, a set of parallel interacting chains are used to address the problem of sampling a multimodal posterior. Instead of drawing samples directly from the posterior probability density, a modified probability density function is defined so that the a parameter of the phase probability distribution (Equation (42)) can be changed to:

$$\sigma = \max(\log\left(1 + e^{(\sigma')}\right), \sigma_{min}) \quad (50)$$

This has the effect of broadening the modes of the posterior probability density. If $\sigma_{min}$ is set to a large value (e.g., 0.5 m), the modes merge and the distribution becomes unimodal. For example, a set of ten MCMC chains are executed in parallel, each having a different value for $\sigma_{min}$. These chains can be considered as forming a stack of chains, with a heavily broadened unimodal chain at the top and the unbroadened chain (with $\sigma_{min}$ set to 0) at the bottom. Adjacent chains may interact via replica exchange, i.e., the states of two adjacent chains are occasionally swapped using the usual Metropolis criterion. At the end of the sampling, only the states of the bottom (unbroadened) chain are used. This bottom chain may accurately sample the multimodal posterior probability density.

Figure 6:
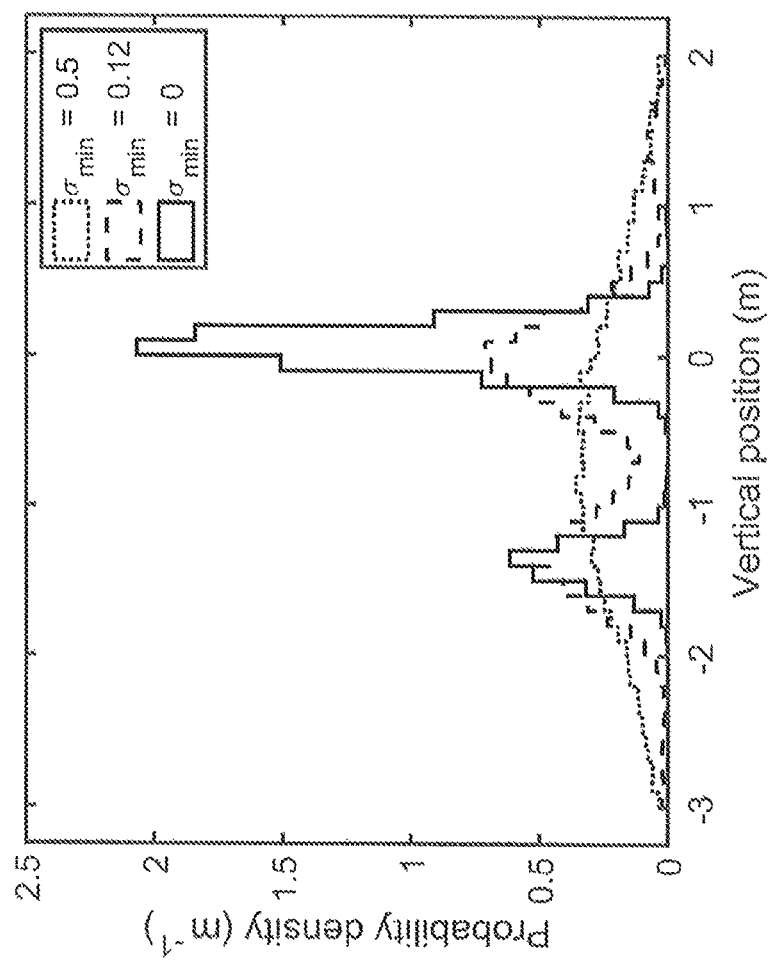
FIG. 6 is a schematic diagram illustrating a method for multimodal sampling using parallel interacting chains, consistent with some embodiments of the present disclosure.

FIG. 6 is a schematic diagram illustrating a method of multimodal sampling using parallel interacting chains, consistent with some embodiments of the present disclosure. Ten MCMC chains are executed in parallel (for clarity, only three chains are shown. In FIG. 6), each having a different value for $\sigma_{min}$. The epoch has a bimodal posterior, with modes at −1.5 m and 0 m. The unmodified chain ($\sigma_{min}$=0) can move between the two modes at −1.5 m and 0 m by interacting with the progressively more broadened chains above. At the top level ($\sigma_{min}$=0.5), the distribution is unimodal. In this way, using multiple chains with modified density function, the tail density on the multimodal distribution can be accurately estimated.

Figure 7:
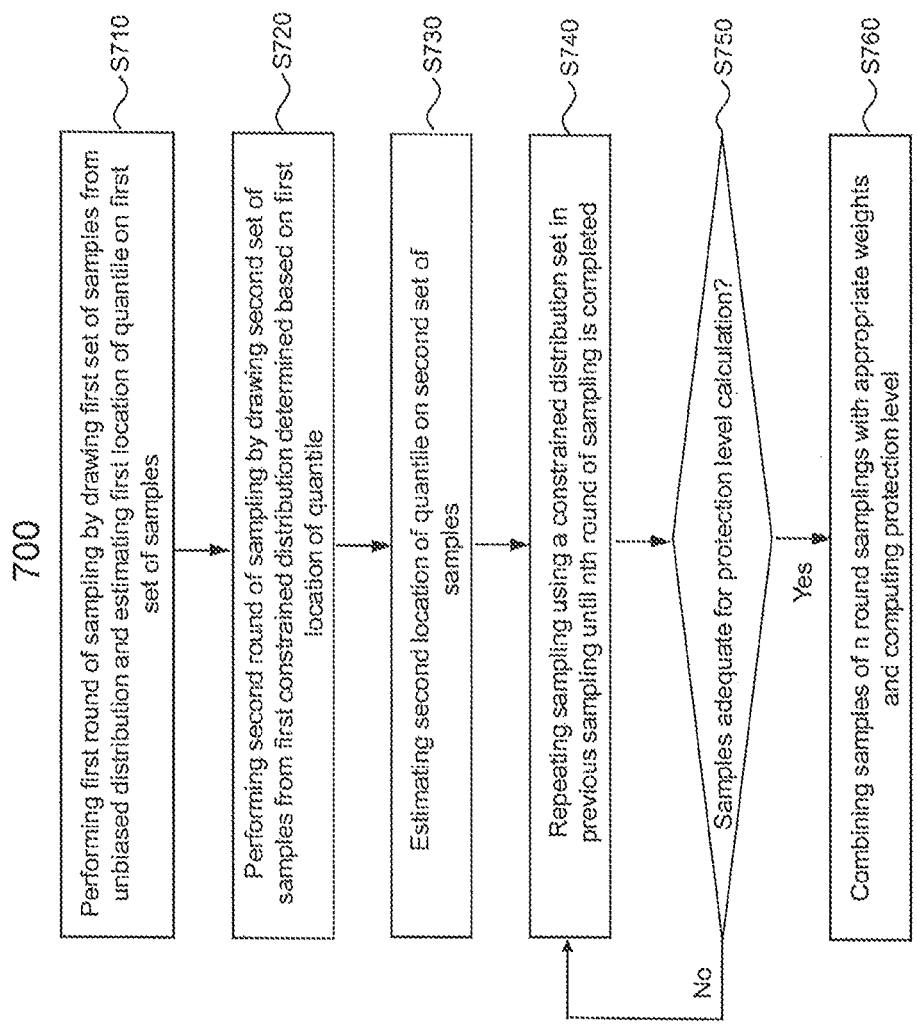
FIG. 7 is a flow chart illustrating a method for performing an umbrella sampling, consistent with some embodiments of the present disclosure.

In an embodiment, instead of drawing a large number of samples directly from the posterior probability distribution, an importance sampling is used. For example, an umbrella sampling is used to draw samples which are biased towards the regions of interest, for example, the tails of the distribution. FIG. 7 is a flow chart illustrating a method 700 for performing an umbrella sampling, consistent with some embodiments of the present disclosure. As shown in FIG. 7, method 700 includes a step S710 of performing a first round of sampling by drawing a first set of samples from an unbiased distribution and estimating a first location of a quantile on the first set of samples. For example, the quantile may be set as a moderate value such as 0.2. This quantile will be used to constrain the sampling pool in a second round of sampling.

Method 700 includes a step S720 of performing a second round of sampling by drawing a second set of samples from a first constrained distribution that is determined based on the first location of the quantile. The first constrained distribution may be set as the tail portions of the unbiased distribution. Method 700 includes a step S730 of estimating a second location of the quantile on the second set of samples. The second location of the quantile is used to set a second constrained distribution for a third round of sampling.

Method 700 includes a step S740 of repeating the sampling using a constrained distribution set in a previous sampling until an nth round of sampling is completed. For example, six rounds of sampling may be used. For the nth set of samples, the constrained distribution set in (n−1)th sampling forces sampling of only the $q''$ portion of the tail. For example, for a quantile value of 0.2, only 0.2 portion of the tail is sampled in the first round, only 0.04 portion of the tail is sampled in the second round, and only 0.008 portion of the tail is sampled in the third round, and so on.

Method 700 includes a step S750 of determining whether the sampling is adequate for a required protection level calculation. If the result of the determination in step S740 is "No", then the method repeats from step S740 and draws another round of samples. On the other hand, if the result of the determination in step S740 is "Yes", in a step S760, all the samples are combined with appropriate weights, and the final protection level is determined.

Figure 8B:
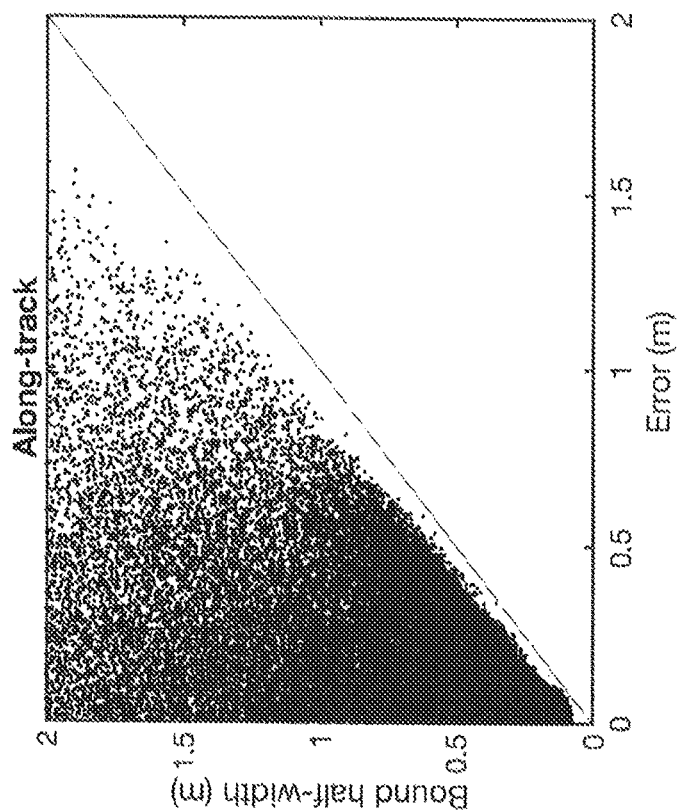
FIGS. 8A and 8B show Stanford plots showing bound half-width and true error obtained from experimental data in the along-track direction.
Figure 8A:
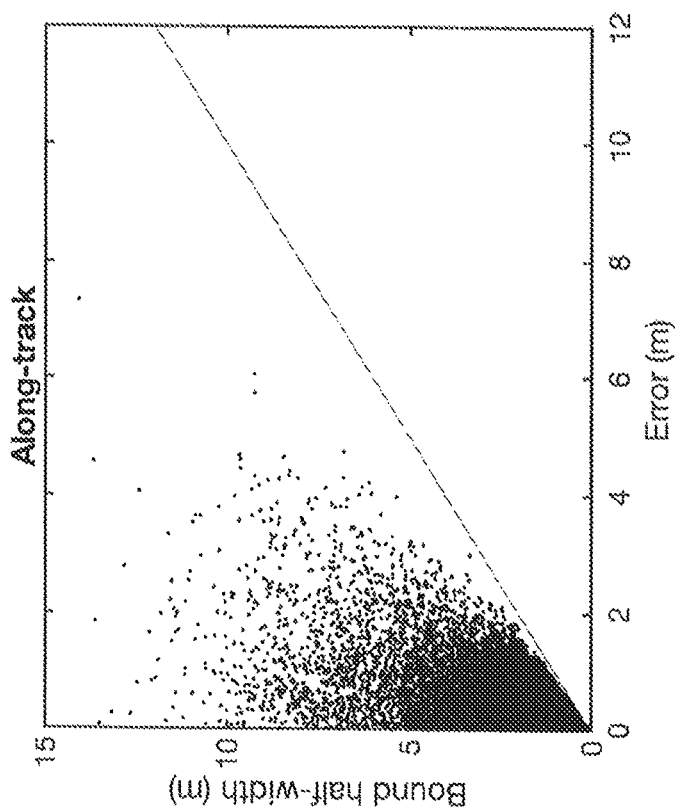
Figure 8D:
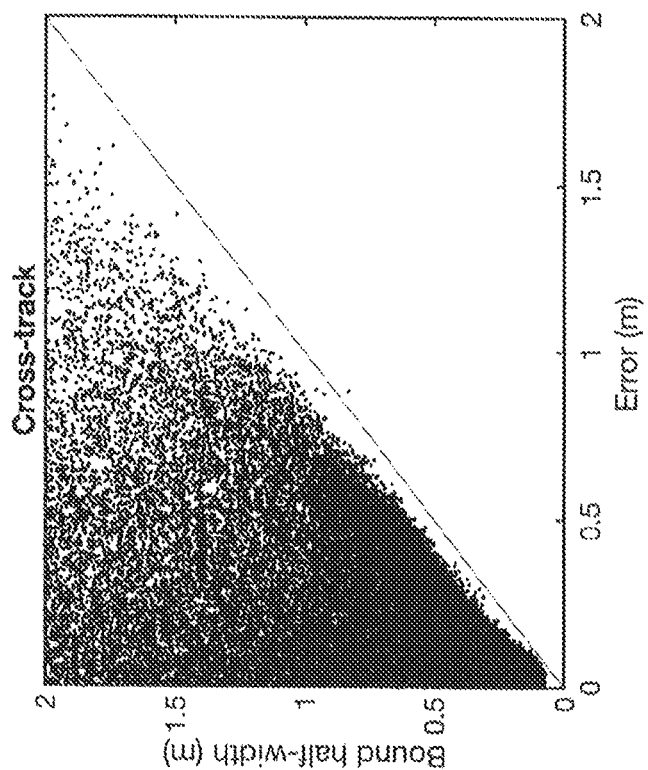
FIGS. 8C and 8D show Stanford plots showing bound half-width and true error obtained from experimental data in the cross-track dimension.
Figure 8C:
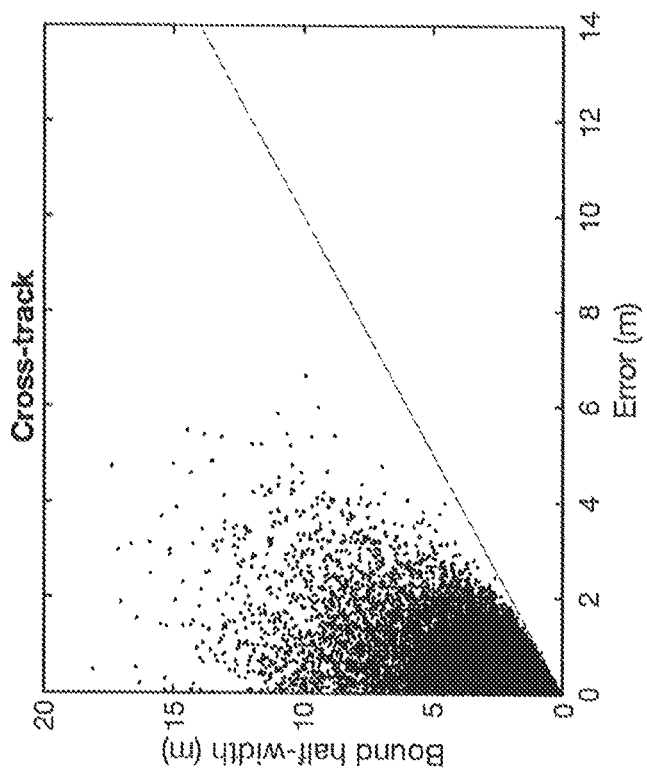
Figure 8F:
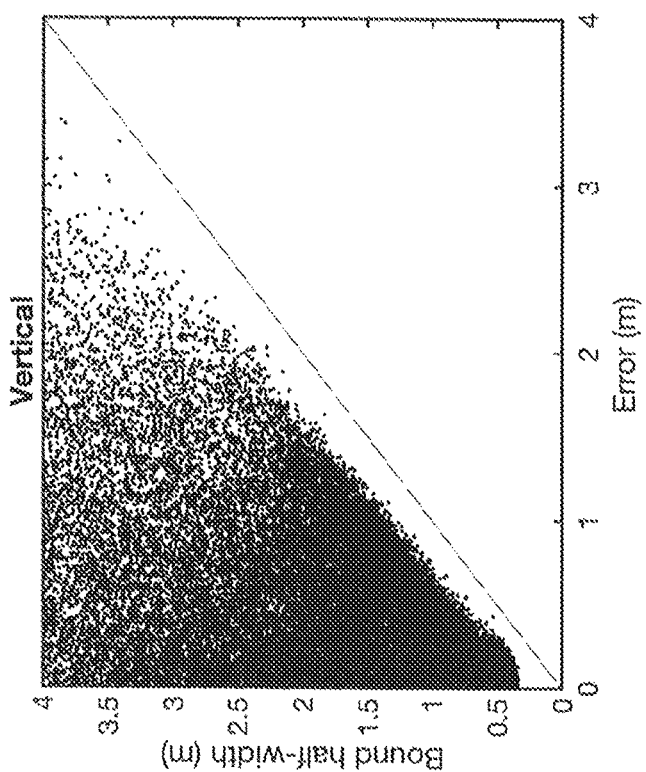
FIGS. 8E and 8F show Stanford plots showing bound half-width and true error obtained from experimental data in the vertical dimension, consistent with some embodiments of the present disclosure.
Figure 8E:
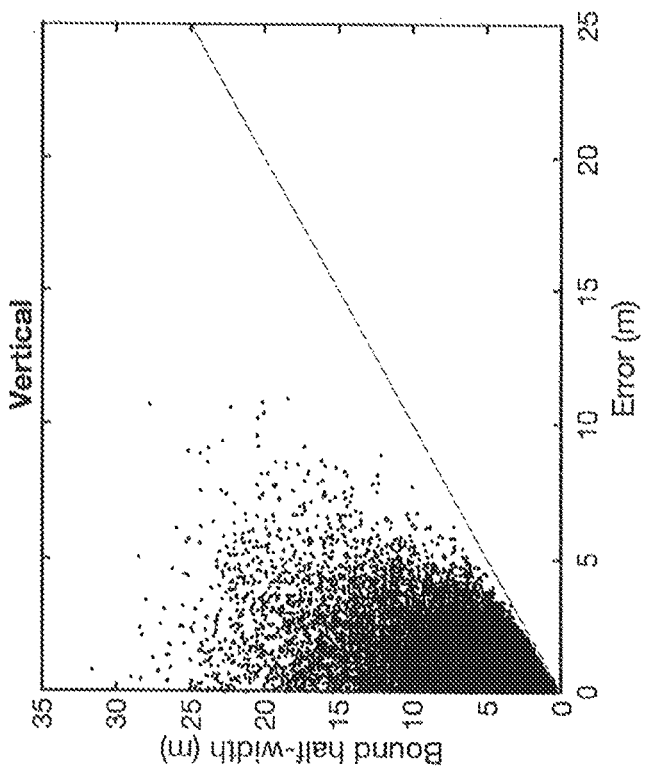

In an embodiment, a system including a receiver (e.g., device 100 in FIG. 1) and a satellite was tested using a small set of trial data. The receiver was disposed in a vehicle, and the set of trial data was composed of data obtained by about 25 hours of driving the vehicle on highways. Measurement residuals were obtained using a real time kinematic (RTK) method, using a local (e.g., within 20 km) reference station and fixing the L1 and the L2 integer ambiguities. The same dataset was used for both fitting the error model parameters θ, and for testing the protection level calculation. The data include measurements from both GPS, Galileo and GLONASS. Phase observations were wide-lane, and not available on GPS satellites which do not transmit a civilian L2 signal. FIGS. 8A and 8B show Stanford plots showing bound half-width and true error obtained from experimental data in an along-track direction, FIGS. 8C and 8D show Stanford plots showing bound half-width and true error obtained from experimental data in a cross-track dimension, and FIG. 8E and FIG. 8F show Stanford plots showing bound half-width and true error obtained from experimental data in a vertical dimension, consistent with some embodiments of the present disclosure. FIG. 8A and FIG. 8B show the same data, but with different axis limits. Similarly, FIG. 8C and FIG. 8D show the same data, but with different axis limits, and FIG. 8E and FIG. 8F show the same data, but with different axis limits. FIG. 8A-8F show protection level and actual error for the test data, with the integrity risk set to one event expected per twenty five hours of data. The availability for cross-track bounds is shown in Table 1 below.

TABLE 1

| Bound half-width (m) | Availability |
| --- | --- |
| 0.2 | 0.494 |
| 0.5 | 0.673 |
| 1.0 | 0.791 |
| 2.0 | 0.903 |
| 5.0 | 0.982 |
| 10.0 | 0.998 |

Here, the availability only considers epochs where enough GNSS signals are available to calculate a bound.

The single epoch position bound algorithm described above forms a core component of the integrity approach. The algorithm can also be used to determine the full (multi-model) posterior distribution that can be used for other applications and not only for bounds or position estimation. In an embodiment, a bound propagation, for example, the single epoch bound is evaluated at a low rate (e.g., once per ten seconds), and in parallel, delta phase observations and sensor data are used to propagate the most recent single epoch bound and position forward to a current time. Mathematically, the bounds at a present time are the sum of the bounds at some previous epoch, plus the bounds on the change in position since that time. To preserve integrity, the risk of misleading information is shared between the absolute bound calculation, and the propagation calculation. Propagation is therefore done with a similar level of integrity to the main bound calculation. By this way, the system may maintain both high availability, low latency, and reduced computational load.

In an embodiment, a prototype propagation scheme is used. The prototype propagation scheme is based on two distinct approaches: (1) modelling the error distribution on delta phase using a non-Gaussian distribution (e.g., a student-t distribution), and evaluating the bounds on delta position numerically using MCMC; and (2) modelling the error distribution using a Gaussian over-bound method, as is used by a receiver autonomous integrity monitoring (RAIM) algorithm in the aviation domain.

In an embodiment, together with GNSS signals or when GNSS signals are not available, sensor-based propagation may be used. For example, measurements made by a motion sensor, such as accelerometers, gyroscopes, wheel speed sensors, or any other sensors disposed in a vehicle may be used for the measurements. In the sensor-based propagation, an extended Kalman filter may be used to track the change in position. Before the outage, GNSS signals may be used to estimate the state of the system (e.g., the orientation and the sensor biases).

In an embodiment, if multipath interference is severe, one or more model parameters may be added. The model parameters may be estimated at the same time as the position. In an embodiment, instead of a local reference station, a state space representation (SSR) correction service may be used. The error associated with the SSR correction service may be treated as a coordinate shift in the solution, and therefore may restore the bound validity by expanding the limits to allow for the possible magnitude of this shift. Alternatively, the SSR errors may be modelled explicitly.

The computer-readable storage medium of the present disclosure may be a tangible device that can store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

The computer-readable program instructions of the present disclosure may be assembler instructions, instruction-set-architecture (ISA) Instructions, machine instructions, machine-dependent instructions, microcode, firmware instructions, state-setting data, or source code or object code written in any combination of one or more programming languages, including an object-oriented programming language, and conventional procedural programming languages. The computer-readable program instructions may execute entirely on a computing device as a stand-alone software package, or partly on a first computing device and partly on a second computing device remote from the first computing device. In the latter scenario, the second, remote computing device may be connected to the first computing device through any type of network, including a local area network (LAN) or a wide area network (WAN).

The flowcharts and block diagrams in the figures illustrate examples of the architecture, functionality, and operation of possible implementations of systems, methods, and devices according to various embodiments. It should be noted that, in some alternative implementations, the functions noted in blocks may occur out of the order noted in the figures. For example, two blocks shown in succession may, in fact, be executed substantially concurrently, or the blocks may sometimes be executed in the reverse order, depending upon the functionality involved.

It is understood that the described embodiments are not mutually exclusive, and elements, components, materials, or steps described in connection with one example embodiment may be combined with, or eliminated from, other embodiments in suitable ways to accomplish desired design objectives.

Reference herein to "some embodiments" or "some exemplary embodiments" means that a particular feature, structure, or characteristic described in connection with the embodiment can be included in at least one embodiment. The appearance of the phrases "one embodiment" "some embodiments" or "another embodiment" in various places in the present disclosure do not all necessarily refer to the same embodiment, nor are separate or alternative embodiments necessarily mutually exclusive of other embodiments.

It should be understood that the steps of the example methods set forth herein are not necessarily required to be performed in the order described, and the order of the steps of such methods should be understood to be merely example. For example, two blocks shown in succession may, in fact, be executed substantially concurrently, or the blocks may sometimes be executed in the reverse order, depending upon the functionality involved. Likewise, additional steps may be included in such methods, and certain steps may be omitted or combined, in methods consistent with various embodiments.

As used in the present disclosure, the word "exemplary" is used herein to mean serving as an example, instance, or illustration. Any aspect or design described herein as "exemplary" is not necessarily to be construed as preferred or advantageous over other aspects or designs. Rather, use of the word is intended to present concepts in a concrete fashion.

As used in the present disclosure, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

Additionally, the articles "a" and "an" as used in the present disclosure and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

Although the elements in the following method claims, if any, are recited in a particular sequence, unless the claim recitations otherwise imply a particular sequence for implementing some or all of those elements, those elements are not necessarily intended to be limited to being implemented in that particular sequence.

It is appreciated that certain features of the present disclosure, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not essential features of those embodiments, unless noted as such.

It will be further understood that various modifications, alternatives and variations in the details, materials, and arrangements of the parts which have been described and illustrated in order to explain the nature of described embodiments may be made by those skilled in the art without departing from the scope. Accordingly, the following claims embrace all such alternatives, modifications and variations that fall within the terms of the claims.

What is claimed is:

1. A computer-implemented method for global navigation satellite system (GNSS) measurements, the method comprising:
specifying, in advance, a prior probability density $P(x)$ of a state x;
specifying, in advance, a system model $h(x)$ that relates the state x to observables z of the measurements;

quantifying, during the measurements, quality metrics q associated with the measurements;
specifying, in advance, a non-Gaussian residual error probability density model $f(r|\theta, q)$ and fitting model parameters $\theta$ determined off-line a priori, where r is a residual error;
defining, during the measurements, a posterior probability density $P(x|z, q, \theta)$;
estimating, during the measurements, the state x; and
computing, during the measurements, a protection level of a position estimate by integrating the posterior probability density $P(x|z, q, \theta)$ over the state x,
wherein defining the posterior probability density is based on the formula:

$$P(x|z, q, \theta) \propto P(x) \prod_i f(z_i - h_i(x) | \theta, q_i)$$

where i is a natural number.

2. The method of claim 1, wherein the system model is specified as:

$$z = h(x) + r;$$

where r is the residual error.

3. A computer-implemented method for global navigation satellite system (GNSS) measurements, the method comprising:
specifying, in advance, a prior probability density $P(x)$ of a state x;
specifying, in advance, a system model $h(x)$ that relates the state x to observables z of the measurements;
quantifying, during the measurements, quality metrics q associated with the measurements;
specifying, in advance, a non-Gaussian residual error probability density model $f(r|\theta, q)$ and fitting model parameters $\theta$ determined off-line a priori, where r is a residual error;
defining, during the measurements, a posterior probability density $P(x|z, q, \theta)$;
estimating, during the measurements, the state x; and
computing, during the measurements, a protection level of a position estimate by integrating the posterior probability density $P(x|z, q, \theta)$ over the state x,
wherein quantifying the quality metrics q associated with the measurements comprises excluding one or more outliers of the measurements using a random sample consensus (RANSAC) technique.

4. A computer-implemented method for global navigation satellite system (GNSS) measurements, the method comprising:
specifying, in advance, a prior probability density $P(x)$ of a state x;
specifying, in advance, a system model $h(x)$ that relates the state x to observables z of the measurements;
quantifying, during the measurements, quality metrics q associated with the measurements;
specifying, in advance, a non-Gaussian residual error probability density model $f(r|\theta, q)$ and fitting model parameters $\theta$ determined off-line a priori, where r is a residual error;
defining, during the measurements, a posterior probability density $P(x|z, q, \theta)$;
estimating, during the measurements, the state x; and
computing, during the measurements, a protection level of a position estimate by integrating the posterior probability density $P(x|z, q, \theta)$ over the state x,
wherein the non-Gaussian residual error probability density model is a student-t distribution function, and specifying the residual error probability density model $f(r|\theta, q)$ further comprises:
identifying a model for a pseudorange using the student-t distribution function as:

$$f_{pr}(r) = \frac{\Gamma\left(\frac{\nu+1}{2}\right)}{\sqrt{\nu\pi\sigma^2}\,\Gamma\left(\frac{\nu}{2}\right)} \left(1 + \frac{r^2}{\sigma^2\nu}\right)^{-\frac{\nu+1}{2}}$$

where r is the residual error, $\nu$ is a degrees of freedom parameter, $\sigma$ is a scaling parameter, and $\Gamma$ is the gamma function.

5. A computer-implemented method for global navigation satellite system (GNSS) measurements, the method comprising:
specifying, in advance, a prior probability density $P(x)$ of a state x;
specifying, in advance, a system model $h(x)$ that relates the state x to observables z of the measurements;
quantifying, during the measurements, quality metrics q associated with the measurements;
specifying, in advance, a non-Gaussian residual error probability density model $f(r|\theta, q)$ and fitting model parameters $\theta$ determined off-line a priori, where r is a residual error;
defining, during the measurements, a posterior probability density $P(x|z, q, \theta)$;
estimating, during the measurements, the state x; and
computing, during the measurements, a protection level of a position estimate by integrating the posterior probability density $P(x|z, q, \theta)$ over the state x,
wherein the non-Gaussian residual error probability density model is a student-t distribution function, and specifying the residual error probability density model $f(r|\theta, q)$ further comprises:
identifying a model for a carrier phase using the student-t distribution function as:

$$f_{phase}(r) = w + (1-w)\frac{\Gamma\left(\frac{\nu+1}{2}\right)}{\sqrt{\nu\pi\sigma^2}\,\Gamma\left(\frac{\nu}{2}\right)} \left(1 + \frac{r^2}{\sigma^2\nu}\right)^{-\frac{\nu+1}{2}}$$

where r is the residual error, $\nu$ is a degrees of freedom parameter, $\sigma$ is a scaling parameter, w is a weight, and $\Gamma$ is the gamma function.

6. The method of claim 4, wherein fitting the model parameters $\theta$ comprises:
defining the degrees of freedom parameter and the scaling parameter using unconstrained student-t parameters;
defining the unconstrained student-t parameters as a function of the quality metrics; and
finding maximum likelihood values for the unconstrained student-t parameters.

7. The method of claim 5, wherein fitting the model parameters $\theta$ comprises:
defining the degrees of freedom parameter and the scaling parameter and the uniform weight parameter using unconstrained parameters;
defining the unconstrained parameters as a function of the quality metrics; and finding maximum likelihood values for the unconstrained parameters.

8. A computer-implemented method for global navigation satellite system (GNSS) measurements, the method comprising:
specifying, in advance, a prior probability density P(x) of a state x;
specifying, in advance, a system model h(x) that relates the state x to observables z of the measurements;
quantifying, during the measurements, quality metrics q associated with the measurements;
specifying, in advance, a non-Gaussian residual error probability density model $f(r|\theta, q)$ and fitting model parameters $\theta$ determined off-line a priori, where r is a residual error;
defining, during the measurements, a posterior probability density $P(x|z, q, \theta)$;
estimating, during the measurements, the state x; and
computing, during the measurements, a protection level of a position estimate by integrating the posterior probability density $P(x|z, q, \theta)$ over the state x,
wherein integrating the posterior probability density over the state comprises:
applying Markov chain Monte Carlo (MCMC) numerical integration using a plurality of interacting chains with modified density functions.

9. A computer-implemented method for global navigation satellite system (GNSS) measurements, the method comprising:
specifying, in advance, a prior probability density P(x) of a state x;
specifying, in advance, a system model h(x) that relates the state x to observables z of the measurements;
quantifying, during the measurements, quality metrics q associated with the measurements;
specifying, in advance, a non-Gaussian residual error probability density model $f(r|\theta, q)$ and fitting model parameters $\theta$ determined off-line a priori, where r is a residual error;
defining, during the measurements, a posterior probability density $P(x|z, q, \theta)$;
estimating, during the measurements, the state x; and
computing, during the measurements, a protection level of a position estimate by integrating the posterior probability density $P(x|z, q, \theta)$ over the state x,
wherein integrating the posterior probability density over the state x comprises:
performing a first round of sampling by drawing a first set of samples from an unbiased distribution of the posterior probability density and estimating a first location of a quantile on the first set of samples;
performing a second round of sampling by drawing a second set of samples from a first constrained distribution of the posterior probability density that is determined based on the first location of the quantile;
estimating a second location of the quantile on the second set of samples, wherein the second location of the quantile is used to set a second constrained distribution for a third round of sampling;
repeating the sampling using a constrained distribution set in previous sampling until nth round of sampling is completed, where n is a natural number greater than 2;
determining whether samples of the n round samplings are adequate for computing the protection level; and
combining the samples of n rounds sampling with appropriate weights when the samples of n rounds are adequate for computing the protection level.

10. A computer-implemented method for global navigation satellite system (GNSS) measurements, the method comprising:
specifying, in advance, a prior probability density P(x) of a state x;
specifying, in advance, a system model h(x) that relates the state x to observables z of the measurements;
quantifying, during the measurements, quality metrics q associated with the measurements;
specifying, in advance, a non-Gaussian residual error probability density model $f(r|\theta, q)$ and fitting model parameters $\theta$ determined off-line a priori, where r is a residual error;
defining, during the measurements, a posterior probability density $P(x|z, q, \theta)$;
estimating, during the measurements, the state x;
computing, during the measurements, a protection level of a position estimate by integrating the posterior probability density $P(x|z, q, \theta)$ over the state x; and
performing bound propagation using phase change error distribution or data obtained by one or more sensors.

11. The method of claim 10, wherein performing the bound propagation further comprises:
modelling an error distribution on a phase change using a non-Gaussian distribution function and evaluating bounds on a position change numerically using a Markov chain Monte Carlo technique; or
modelling the error distribution on the position change using a Gaussian over-bound method.

12. The method of claim 1, wherein the state x is defined as:

$$x = \begin{bmatrix} p \\ c\Delta dt_r \\ \Delta k_{P,r} \\ \Delta k_{L,r} \\ \Delta T_{zenith} \end{bmatrix}$$

where p is the position of a rover, c is the speed of light in vacuum, $\Delta dt_r$ is a difference in receiver clock bias between the rover and a base station, $\Delta k_{P,r}$ is a difference in receiver code instrumental delays on pseudorange, $\Delta k_{L,r}$ is a difference in receiver code instrumental delays on carrier phase, and $\Delta T_{zenith}$ is a difference in zenith tropospheric delays.

13. An apparatus for global navigation satellite system (GNSS) measurements, the apparatus comprising:
a receiver configured to receive a GNSS signal and process the received signal for the measurements; and
a processor configured to:
specify a prior probability density P(x) of a state x;
specify a system model h(x) that relates the state x to observables z of the measurements;
quantify quality metrics q associated with the measurements;
specify a non-Gaussian residual error probability density model $f(r|\theta, q)$ and fitting model parameters $\theta$ using a set of experimental data, where r is the residual error;
define a posterior probability density $P(x|z, q, \theta)$; and
estimate the state x; and
compute a protection level of a position estimate by integrating the posterior probability density $P(x|z, q, \theta)$ over the state x, wherein defining the posterior probability density is based on the formula:

$$P(x \mid z, q, \theta) \propto P(x) \prod_i f(z_i - h_i(x) \mid \theta, q_i)$$

where i is a natural number.

14. The apparatus of claim 13, wherein the processor is further configured to:
communicate with an external sensor to obtain position change data tracked by the sensor to determine a bound propagation.

* * * * *